United States Patent
Viaud et al.

(10) Patent No.: US 7,404,284 B2
(45) Date of Patent: Jul. 29, 2008

(54) CONVEYOR ASSEMBLY AND POSITIONING ARRANGEMENT FOR A BALER

(75) Inventors: Jean Viaud, Gray (FR); Emmanuel Chapon, Velet (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/678,661

(22) Filed: Feb. 26, 2007

(65) Prior Publication Data

US 2008/0028737 A1   Feb. 7, 2008

(30) Foreign Application Priority Data

Aug. 3, 2006   (DE) ................. 10 2006 036 199

(51) Int. Cl.
*A01D 39/00* (2006.01)
*A01D 43/02* (2006.01)
*A01D 75/00* (2006.01)

(52) U.S. Cl. ............................ 56/341; 100/6
(58) Field of Classification Search ............ 56/341, 56/10.2 R, 343, 342; 460/112; 100/88, 87, 100/89, 3, 4, 5
See application file for complete search history.

(56) References Cited

U.S. PATENT DOCUMENTS

| | | | | |
|---|---|---|---|---|
| 740,215 A | * | 9/1903 | Bartholow | 460/109 |
| 2,484,228 A | * | 10/1949 | Isay | 460/46 |
| 4,955,188 A | * | 9/1990 | von Allworden | 56/341 |
| 5,819,517 A | * | 10/1998 | Amanatidis et al. | 56/341 |
| 6,370,851 B1 | * | 4/2002 | Uros et al. | 56/10.2 R |
| 6,769,239 B1 | * | 8/2004 | Webb | 56/341 |
| 2002/0011061 A1 | * | 1/2002 | Lucand et al. | 56/341 |

FOREIGN PATENT DOCUMENTS

DE    19841598 A1 *  3/2000

* cited by examiner

*Primary Examiner*—Árpád Fábián-Kovács

(57) ABSTRACT

A conveyor assembly is provided on a baler between a crop take-up arrangement and a baling chamber. The conveyor assembly includes a guide member assembly having an upwardly facing guide surface defining a lower limit of a crop conveying channel having an upper limit defined by an undershot rotor positioned above the guide surface. The conveyor assembly further includes a cutting arrangement mounted to a lower side of the guide member and having knives located for projecting through slots provided in the guide member. The cutting arrangement can be lowered together with the guide member, as well as shifted transverse to the forward operating direction relative to the guide member. In this way jams can be avoided or removed, and the cutting arrangement can be brought into a position accessible for purposes of maintenance, as well.

10 Claims, 9 Drawing Sheets

CONVEYOR ASSEMBLY AND POSITIONING ARRANGEMENT FOR A BALER

FIELD OF THE INVENTION

The invention concerns a crop gathering arrangement for a baler including an assembly of a guide surface of a conveying channel, a cutting arrangement and a positioning arrangement.

BACKGROUND OF THE INVENTION

It is known practice according to DE 38 21 717 to pivot a complete cutting arrangement from a location underneath a self-loading forage box and behind a crop take-up arrangement about a vertical axis into a position located alongside the crop take-up arrangement where the knives of the cutting arrangement are easily accessible for maintenance.

Furthermore, the prospectus KRONE Big Pack—D-10/05-0510-2701 reveals a cutting arrangement with two modules that abut each other in the longitudinal center plane of a baler and that can be pushed aside for the purpose of maintenance. In addition, the entire cutting arrangement can be lowered into a non-operating positon by means of a servomotor. A similar arrangement is also known from EP 284 792 A1.

Finally, according to DE 198 41 598, it is known practice that the floor of a conveying channel of a baler can be pivoted away from the conveying channel along with all its knives in order to remove jams more easily.

The problem underlying the invention is seen in the fact that a solution does not exist that permits simple maintenance as well as an efficient reaction to jams.

SUMMARY OF THE INVENTION

According to the present invention, there is provided crop gathering assembly, for delivering crop for further processing, which includes components which may be repositioned in a manner for overcoming the drawbacks of the prior art.

An object of the invention is to provide a crop gathering assembly including a positioning arrangement for a guide surface of a conveying channel and for a cutting arrangement, wherein the positioning arrangement is operable for repositioning the cutting arrangement in the direction of, as well as with, the guide surface.

In this way, the entire assembly, that is, the guide surface as well as the cutting arrangement can be lowered in order to prevent or to remove a jam; but this assembly can also be repositioned to the side so that the knives, in particular, are accessible for maintenance purposes. The repositioning away from a rotor is performed by means of the positioning arrangement that can be configured as a motor, for example a hydraulic motor or an electric motor. The repositioning in the plane of the extent of the guide surface represents a translational movement, for example, in or on rails—a small pivoting movement could also be performed by means of short steering arms that move the cutting arrangement at first radially away from the conveyor rotor and then axially in its direction. Although only the cutting arrangement and the guide surface have been cited as essential components of the invention, other components are also present, for example, the knife retainers and their adjusting devices. Unlike in the state of the art, here the cutting arrangement is not repositioned alone but the guide surface with it, so that the cross section of the conveying channel is enlarged much further in order to safely avoid jams in the flow of the crop.

The use of guides in the form of rails on the guide surface for the adjustment of the cutting arrangement has the advantage that the cutting arrangement is guided safely during its movement and cannot be tilted or cocked. Rails with a U-shaped Omega-shaped or T-shaped or some other profile can be used for the rails as well as simple tubes that carry or guide wheels or sliding bearings of the cutting arrangement in or on themselves. The attachment of the guide arrangement to the guide surface has the advantage that a repositioning of the guide surface simultaneously repositions the cutting arrangement.

In cases in which the cutting arrangement is configured very wide, particularly as wide as a crop take-up arrangement located upstream of it, it can nevertheless be pulled to the side sufficiently, if the guide arrangement is configured so as to be telescoped. In this case, no retainer arrangement is required on an adjoining component, for example, on the crop take-up arrangement, but the guide arrangement in itself carries the cutting arrangement over the entire positioning path.

If, on the one hand, the cutting arrangement can preferably be moved in or on rails, tubes or the like, then it is also possible, on the other hand, to use steering arms or joints with which the cutting arrangement along with the guide surface can be pivoted away from the conveying channel and to the side. This pivoting movement need not provide the entire adjustment over the entire positioning path; rather a partial adjustment is sufficient, for example, until it reaches the guide arrangement and then can be brought completely into a maintenance position.

The conveying channel can be used for cutting arrangement as well as for conveying only, if the knives can be repositioned between an operating position and a non-operating position. This repositioning can be performed manually as well as by means of a motor under remote control. It is also possible to have the knives move under a load from their operating position if spring loaded retainers of known configuration are provided.

If the cutting arrangement can be immobilized at the guide surface, these two components can be repositioned together, so that a single positioning arrangement can be sufficient under certain circumstances. On the other hand, the immobilization can also be released so that the cutting arrangement can be removed or repositioned for maintenance purposes or the like.

A positioning arrangement to reposition the knives within the cutting arrangement, for example, by means of a hydraulic cylinder that acts upon all of the knives or a part of the knives, makes it possible to vary length of cut of the crop or to pivot the knives for a reversing process or to remove a jam. This pivoting can be triggered manually as desired or controlled by sensors.

Since the guide surfaces and the cutting arrangement are formed by two modules, that can be brought into a non-operating position away from each other, a cutting arrangement, possibly a very long one, need not be moved to one side, but two halves or one of them can be extracted to such a degree that maintenance or replacement of knives is possible.

The same advantage as that of telescopic guidance can be attained if the modules in their central region are configured so as to overlap at least partially, so that if they are then extracted over their entire length, they are still controlled by the guidance arrangement.

While such assemblies can be applied in many cases, for example, also in the industrial processing of goods to be baled, nevertheless the use in a baler, particularly for agricultural products is highly advantageous if they are arranged between a crop take-up arrangement and a baling chamber, since there malfunction in the flow of crop or damage to the knives can occur that must be remedied rapidly.

In the case of a baler in which the cutting arrangement is wider than the baling chamber, it is not necessary to initially deflect long or troublesome crop and then to cut it, but it can be cut into small pieces initially and then it can be conveyed considerably more easily, which in turn increases the service life of the cutting arrangement.

BRIEF DESCRIPTION OF THE DRAWINGS

The drawings show an embodiment of the invention that shall be described in greater detail in the following.

DESCRIPTION OF THE PREFERRED EMBODIMENT

Figure 1:
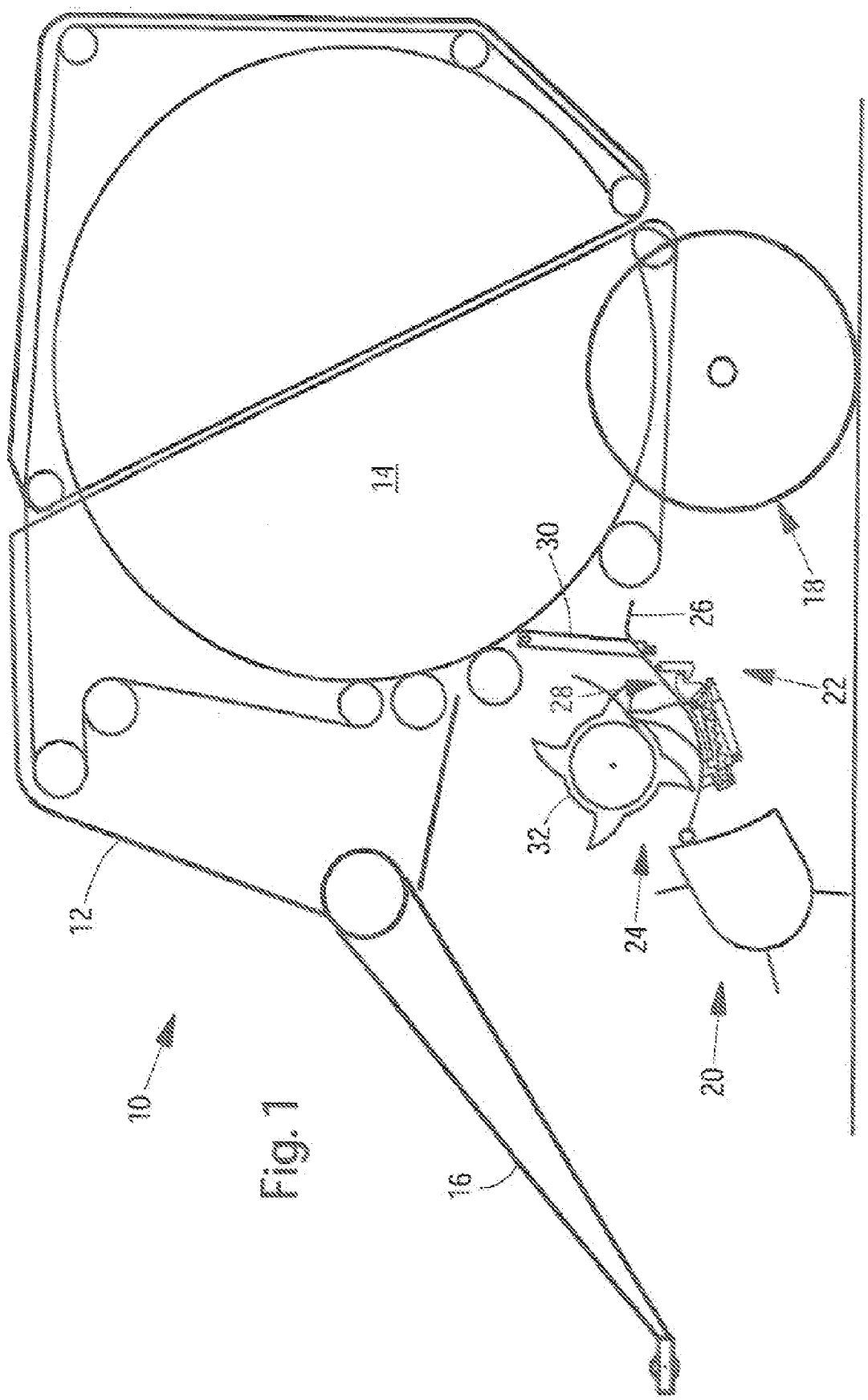
FIG. 1 shows a schematic side view of a baler with a crop gathering arrangement including an assembly of a guide surface, a conveying channel of a cutting arrangement and a positioning arrangement.

A baler 10, shown in FIG. 1, is generally provided with a baler housing 12 defining opposite sides of baling chamber 14 to which is attached to towbar 16, running gear 18, a crop take-up arrangement 20 and a conveyor assembly 22 constructed in accordance with the present invention.

In this embodiment, the baler 10 is configured as a rotobaler, with the baling chamber 14 being variable. The baler 10 could alternatively be provided with a baling chamber 14 of constant size, or the baler could be configured as a piston baler for producing parallelepiped bales. In the same sense, the configuration as a baler 10 is not necessarily significant; rather the conveyor assembly, according to the invention, can also be applied to a self-loading forage box or the like.

Depending on the configuration of the baler 10, the baler housing 12 is equipped with walls, not shown or characterized, and baling elements also not shown, which form the baling chamber 14 in themselves and between themselves, are supported on the running gear 18 and can be attached to a towing vehicle by means of the towbar 16.

The baling chamber accepts crop to be baled, for example, hay, straw or silage, or the product to be baled may be industrial garbage or the like, from the conveyor assembly 22 and lets a bale to be formed in its interior.

The crop take-up arrangement 20 is configured as a so-called pick-up that takes crop directly from the ground and conducts it to the conveyor assembly 22 in an overshot manner. Other crop take-up devices or crop supply arrangements in general, for example, conveyor belts or conveyor shafts, could also be used.

The conveyor assembly 22 is located between the crop take-up arrangement 20 and the baling chamber 14 in a conveyor channel 24 that is open upwards with a guide surface 26 towards the bottom and includes a cutting arrangement 28 and a positioning arrangement 30.

The conveyor assembly 22 can be configured as a single unit and be connected interchangeably at corresponding interface locations to the crop take-up arrangement 20 and the baler housing 12, or it may be an integral component of these.

Figure 2:
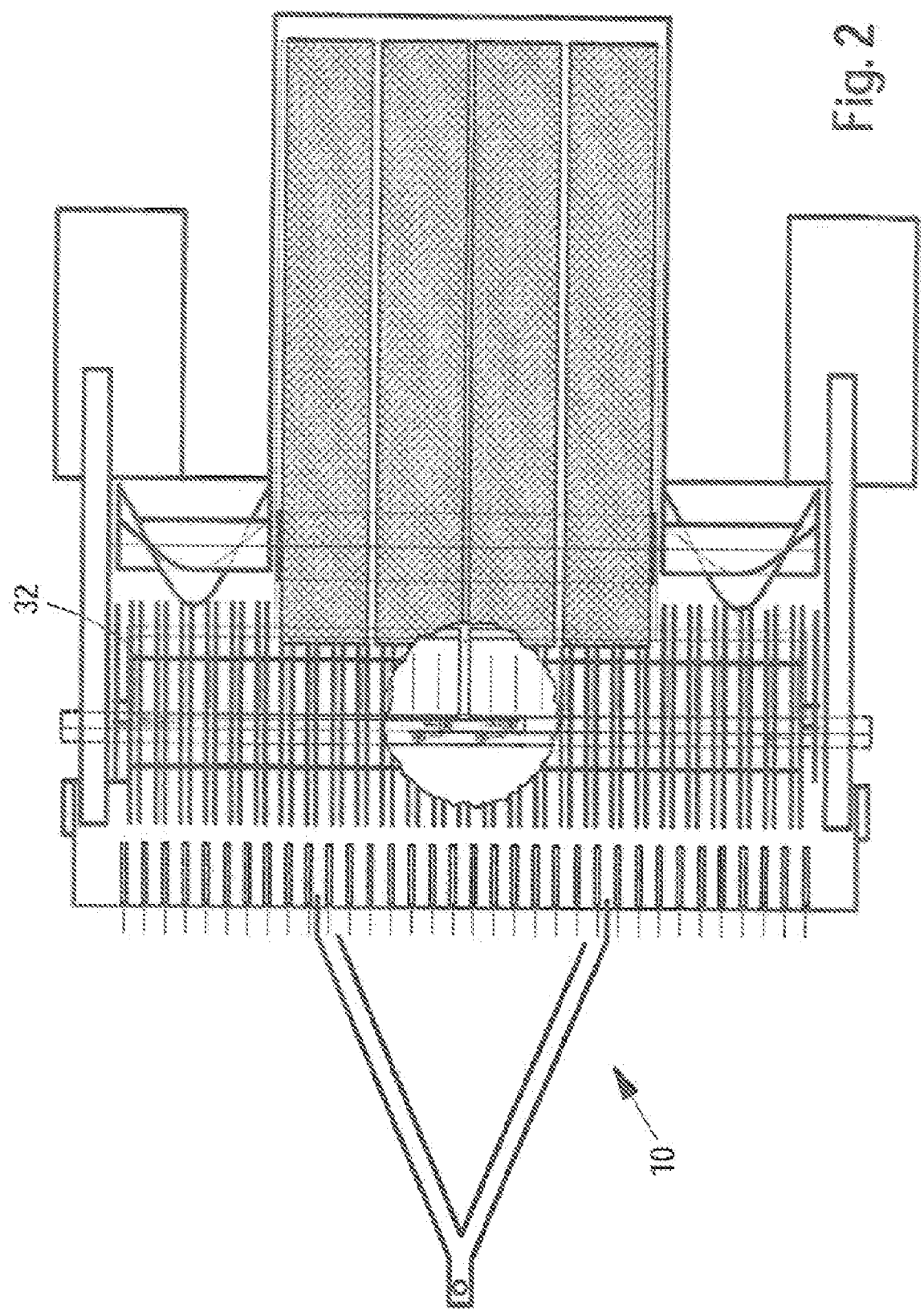
FIG. 2 shows a plan view of the baler of FIG. 1 in an operating position, with an upper forward portion of the baler being omitted and a central portion of the crop feed rotor being broken away so as to reveal an inner end region of a guide arrangement for a pair of cutting arrangement modules.
Figure 3:
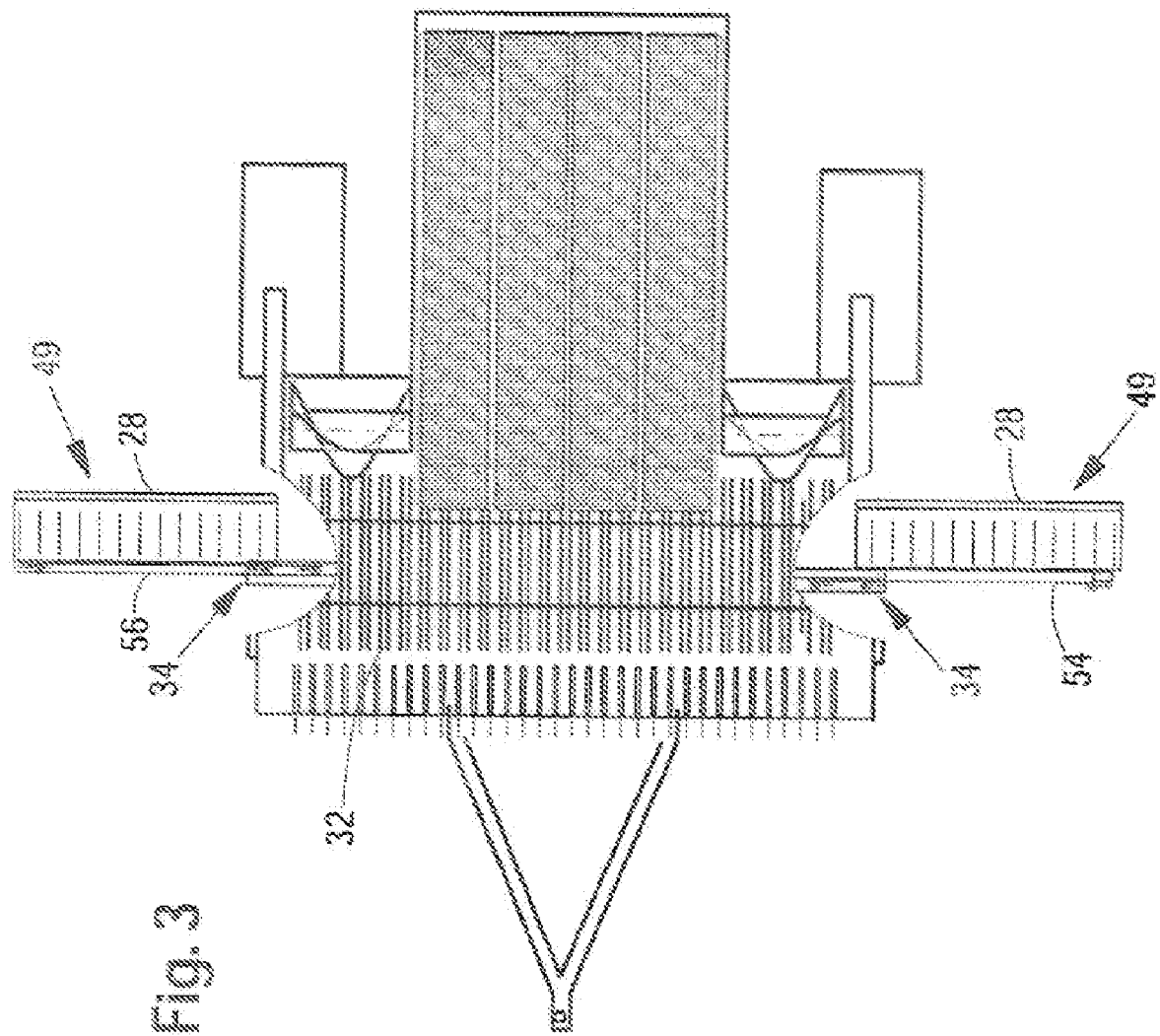
FIG. 3 shows the baler of FIG. 2 in a non-operating or maintenance position.
Figure 4:
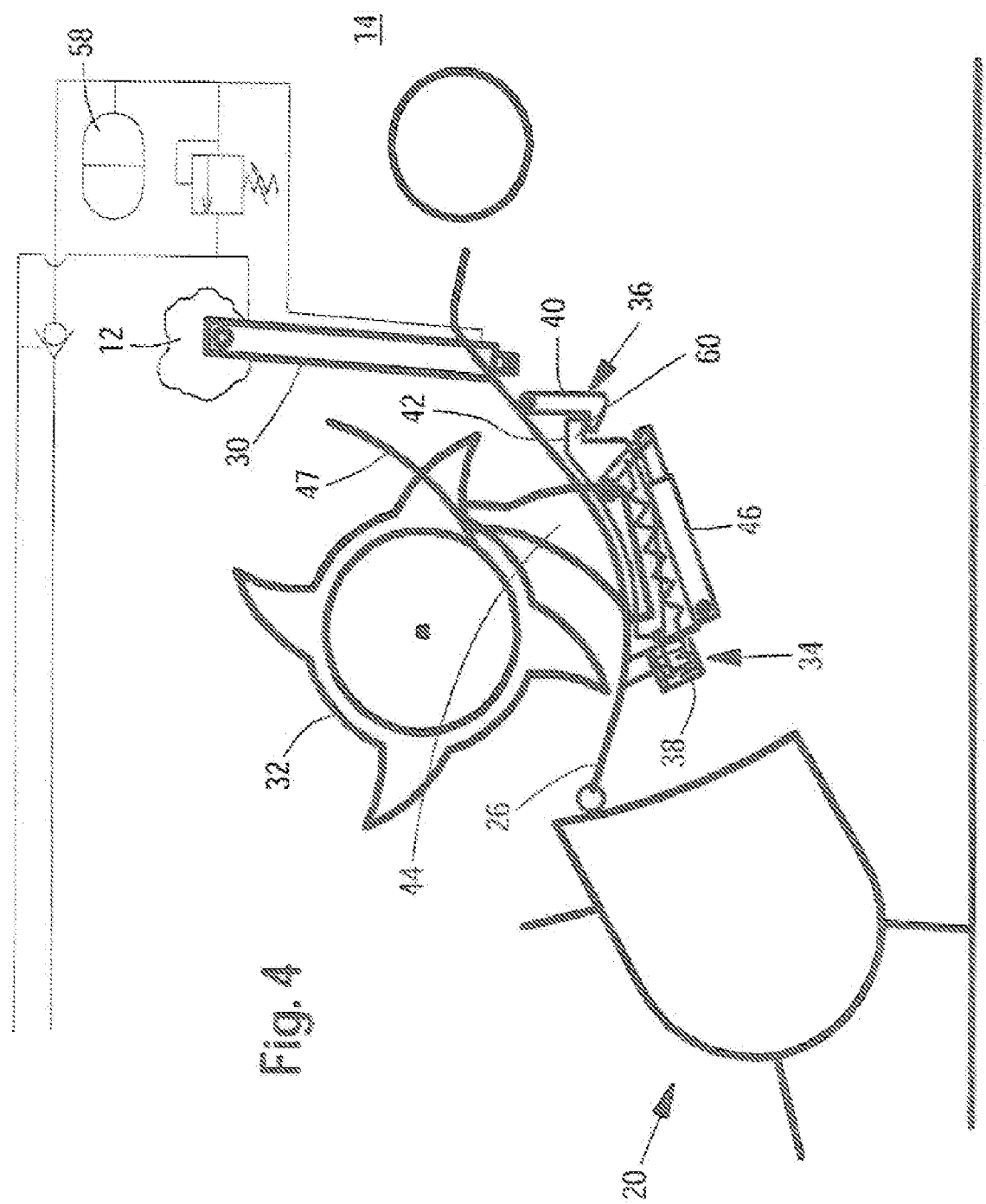
FIG. 4 shows an enlarged side view of the assembly in its operating position.
Figure 5:
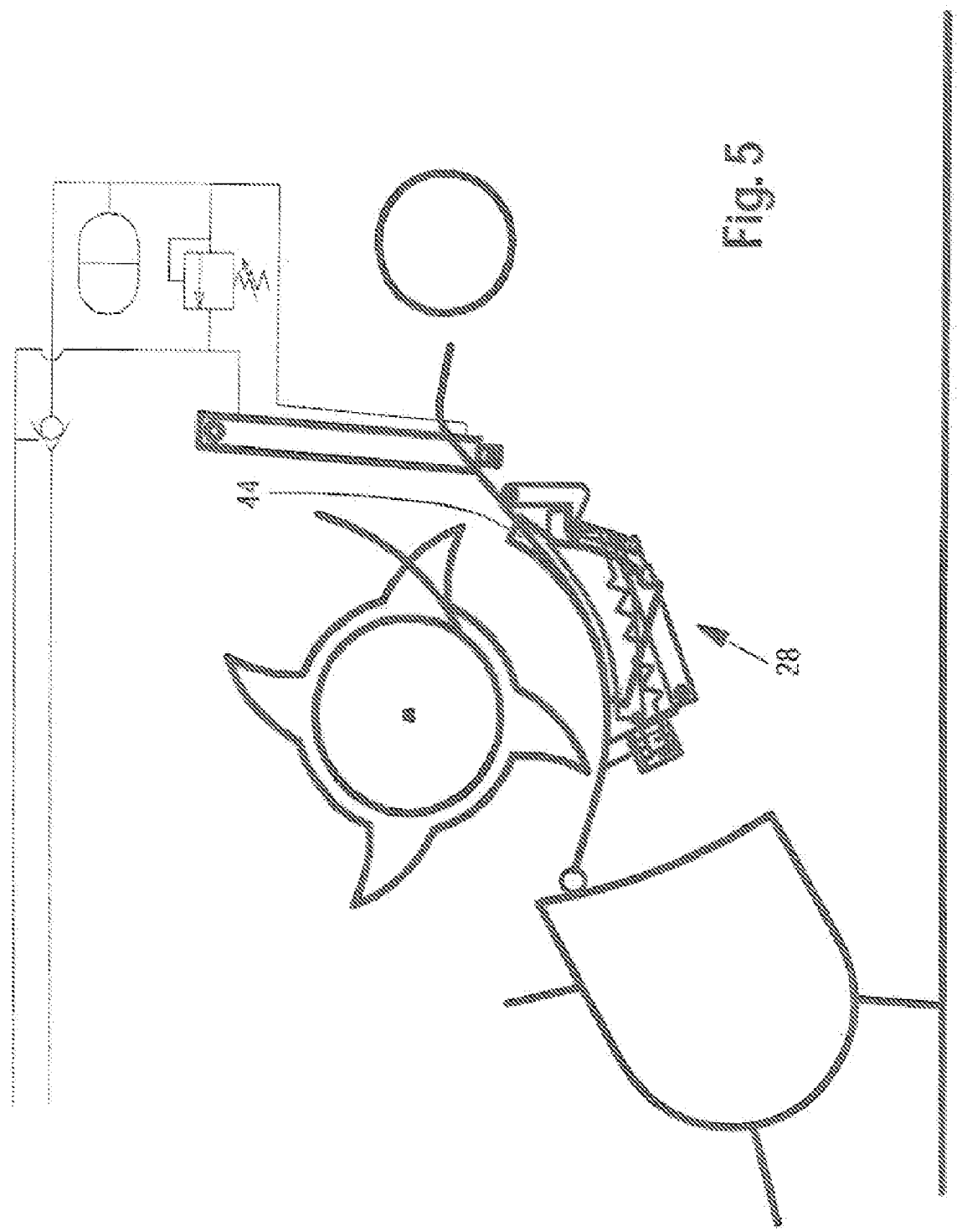
FIG. 5 shows the assembly of FIG. 4, but with knives in a non-operating position.
Figure 6:
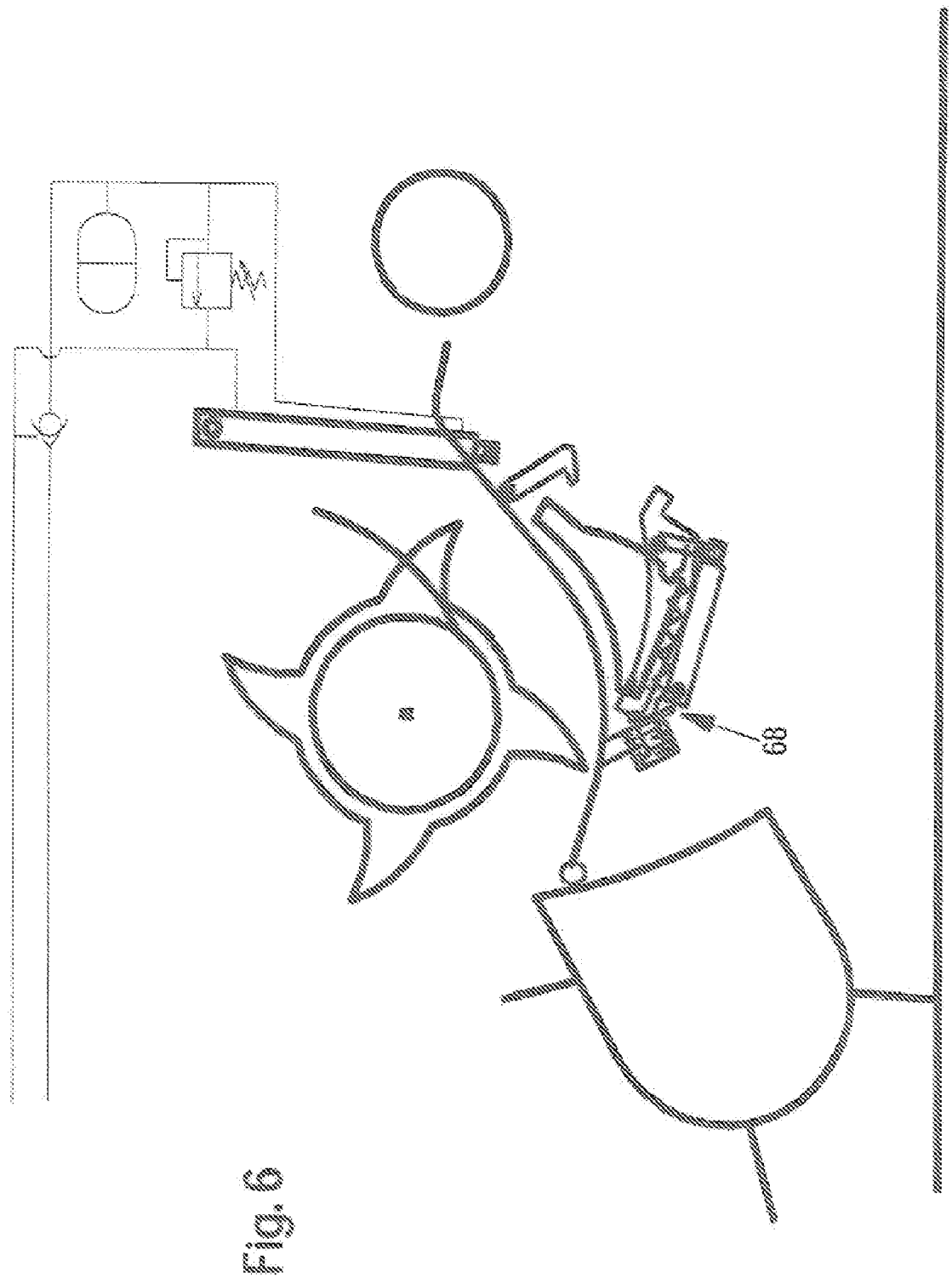
FIG. 6 shows the assembly as it is pivoted as a unit away from the conveying surface.
Figure 7:
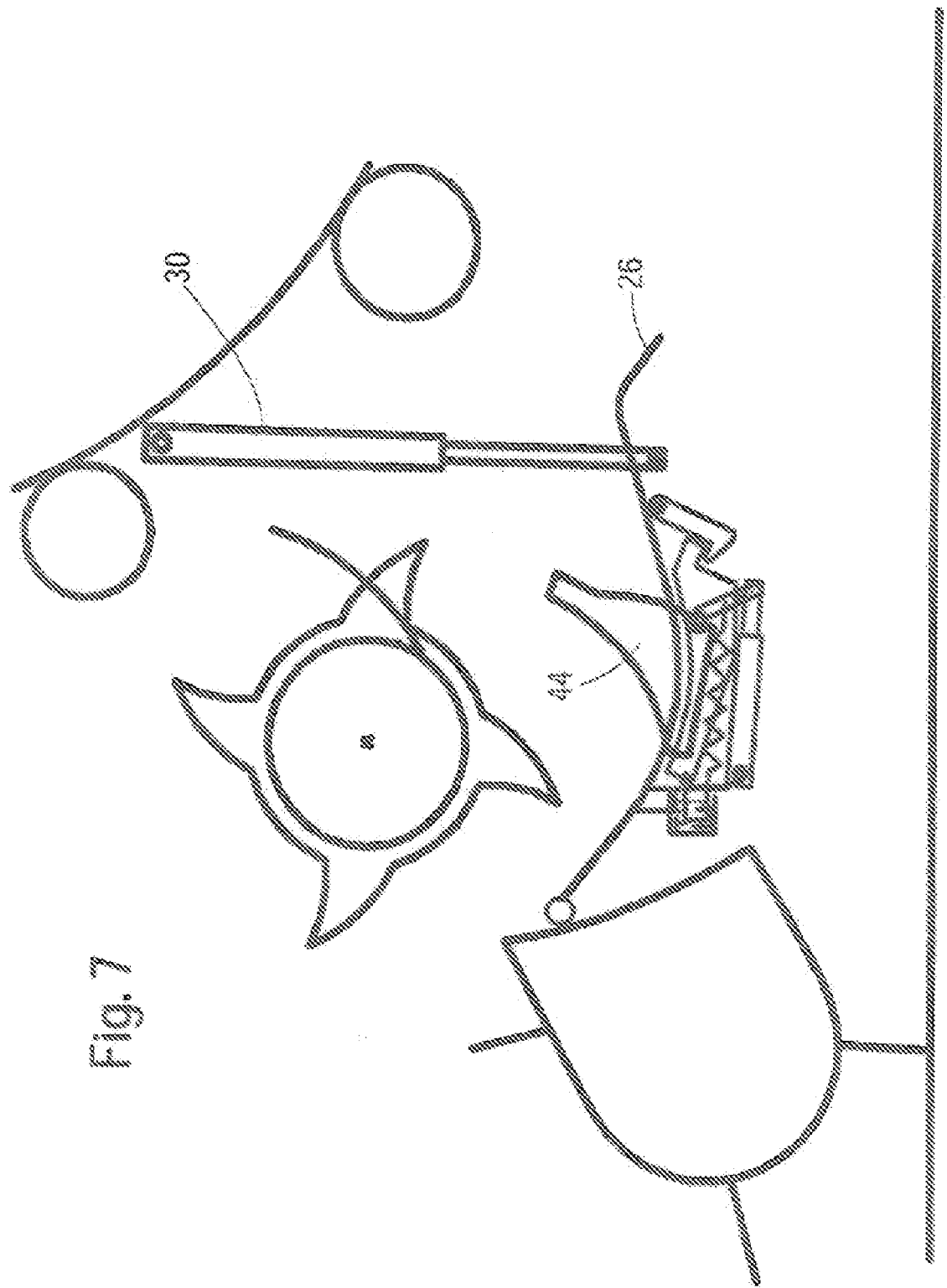
FIG. 7 shows the assembly as it is pivoted downward with the conveying surface.

As can be seen particularly in FIGS. 2 and 3, in this embodiment the conveyor assembly 22 is as wide as the crop take-up arrangement 20 but narrower than the baling chamber 14; however, for the purposes of the invention, this is not a requirement.

The conveying channel 24 is bordered at its bottom by the guide surface 26 and at its sides by walls, not shown. At its upper side, the conveying channel 24 is bordered by a rotor 32, which is driven and conveys in an undershot manner. This rotor 32 would also be provided if the assembly 22 does not include a cutting arrangement 28.

The guide surface 26 is configured as a sheet metal component that is stiff in bending and is provided with a multitude of slots extending in the direction of conveying, it generally follows a part of the circumference of the rotor 32. The forward, upstream end of the guide surface 26 is supported in bearings, free to pivot, on the crop take-up arrangement 20, and on its rear side, located downstream, it is retained by the repositioning arrangement 30. The downstream edge of the guide surface 26 reaches up to the baling chamber 14, in order to permit a perfect transfer of the crop. On the bottom of the guide surface 26, a guide arrangement 34 is provided at the front and a lock 36 at the rear. At its upstream end, the guide surface 26 can be attached to the crop take-up arrangement 20 so as to pivot simply or as well as in its height, movably supported in bearings and spring loaded and/or controlled towards the circumference of the rotor 32 or away from it, as this is known in itself but is not shown here.

The guide arrangement 34 contains a U-shaped rail 38 that is open to the rear and is rigidly attached to the underside of the guide surface 26. A complementary guide part (slide 48, carrier 54, 56) engages in this guide arrangement 34, and is located on the cutting arrangement 28 and shall be described further in the following.

In the embodiment shown, the lock arrangement 36 contains a hook 40 that can be actuated manually or remotely controlled by a motor. In place of the hook 40, a pin connection or another lock could also be provided. Here, too, there is a complementary component on the cutting arrangement 28.

Basically, the cutting arrangement 28 is configured in a known manner and includes a frame 42 in which a multitude of knives 44 are retained so that they can be repositioned, where the repositioning is performed, on the one hand, against the force of mechanical or hydraulic springs, in order to deflect in the case of an overload and that is triggered, on the other hand, by a positioning arrangement 46 in order to move all knives 44 out of the conveying channel 24 so that the crop can be conveyed through it without being cut. In the operating condition of the cutting arrangement 28, the knives 44 extend through the slots in the guide surface 26 up to a position close to the rotor 32; in the non-operating condition they are retracted up to or below the guide surface 26. Finally, strippers 47 are associated with the cutting arrangement 28, they extend into the gaps between the drivers of the rotor 32 and are attached to the baler housing 12.

According to FIGS. 2 and 3, the cutting arrangement 28 is subdivided into two modules 49 that are divided in the area of the longitunal center plane of the baler 10 underneath the rotor 32 and come into contact with each other at the point.

Figure 8:
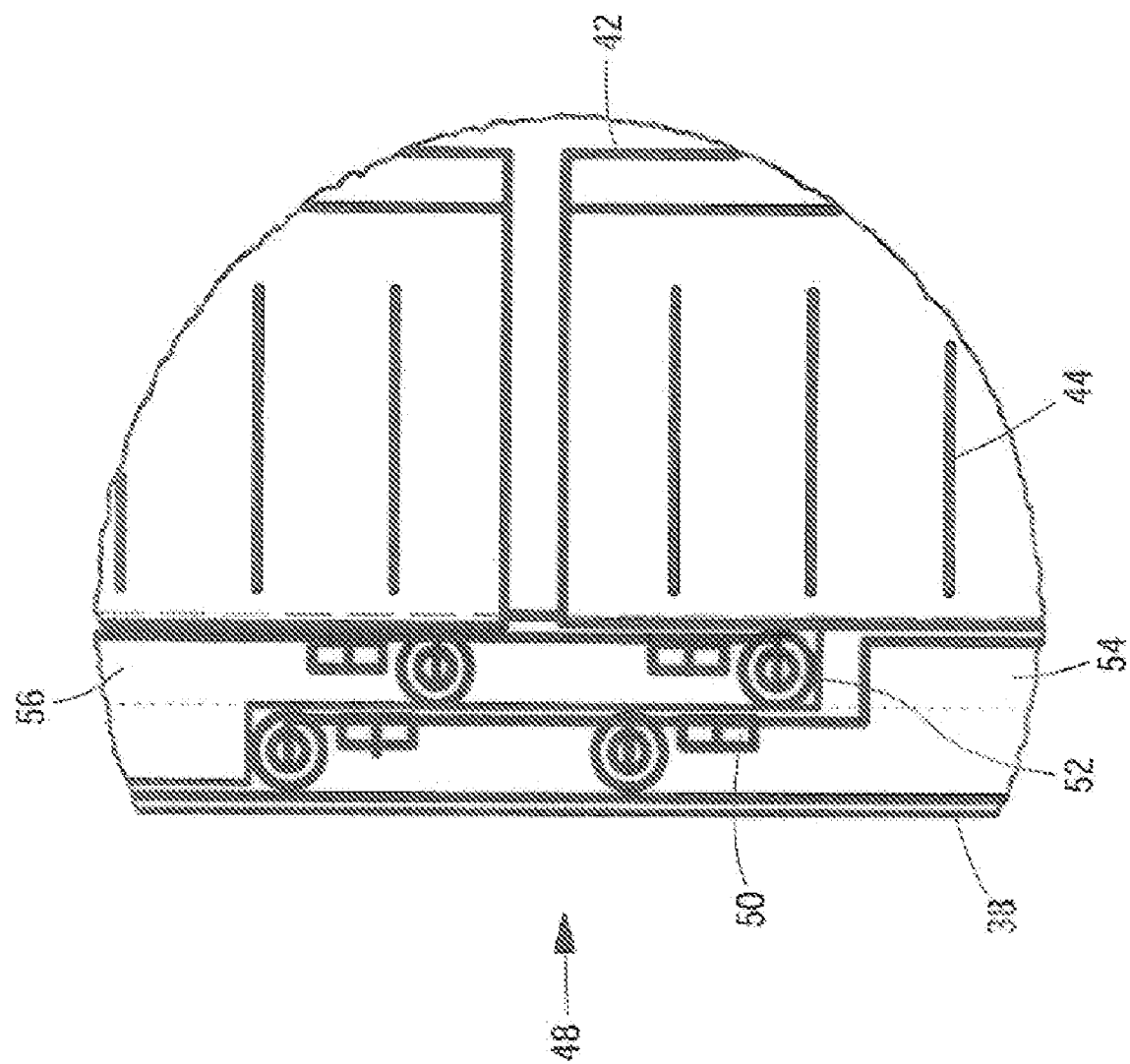
FIG. 8 shows an enlarged plan view of the guide arrangement with partially overlapping modules of the cutting arrangement, shown in FIG. 2.

On its side facing the guide arrangement 34, the frame 42 is attached to a slide 48 that is engaged in the U-shaped rail 38 (see FIG. 8). This slide 48 is configured in a known manner and permits the cutting arrangement 28 to move over a distance that corresponds approximately to its length. For easier repositioning that can be performed manually as well as by means of a motor, the slide 48 contains rollers 50 oriented approximately vertically and rollers 52 oriented approximately horizontally, each of which is supported in the U-shaped rail 38 and, according to FIG. 3, support in bearings, free to roll, a carrier 54 on the one hand and a carrier 56 on the other hand, which is connected to the frame 42 in a joint 68, so as to pivot vertically. In the region facing the center of the baler 10, the carriers 54, 56 overlap transverse to the direction of operation so that they are actually wider than the frame 42 and are still retained in the U-shaped rail 38 in their fully extended condition, the U-shaped rail 38, the rollers 50 and 52 and the carriers 54, 56 are dimensioned in such a way that in the case of the configuration according to FIGS. 1 through 8, they can carry freely and retain the cutting arrangement 28, whereas according to the second embodiment they are conducted upstream as well as downstream.

In the embodiment shown, the positioning arrangement 30 is configured as a double-acting linear hydraulic motor that is connected to a conventionally configured hydraulic system which contains a gas pressure accumulator 58, that operates only on the rod side of the positioning arrangement 30, that is along the path of the cutting arrangement 28 away from the rotor 32. The positioning arrangement 30 is attached at the top to the baler housing 12 and at the bottom to the guide surface 26, in each case free to pivot. Although it is not shown, the positioning arrangement 30 can nevertheless be extended or retracted so that, for example, the cross section of the conveying channel 24 can be varied or it can move downward depending upon the supply of crop. In place of the hydraulic motor, an electric motor could be used or in the simplest case, a lever, a rope pull or the like could be used. The control or regulation of the positioning arrangement 30 can be performed automatically by means of sensors, not shown, as well as manually from a towing vehicle, also not shown.

The rotor 32 accepts harvested crop from the crop take-up arrangement 20 and conveys it to the baling chamber 14, where it is pressed against the knives 44 and is cut by these, unless these are in a non-operating condition. The rotor 32 can also be operated in reverse in order to remove a possible jam.

The locking arrangement 36 includes the hook 40 that reaches over the frame 42 or a projection 60 attached to it. The hook 40 is attached to the guide surface 26 and can be repositioned manually or by means of a motor. If the hook 40 has been moved out of its position retaining the frame 42, the frame 42 can pivot vertically downward so that the access to the knives 44 from above is opened up. If necessary, the frame 42 can be lowered and possibly raised again by means of a mechanical positioning arrangement or by a motor, not shown. In case that such a positioning arrangement is not available, the guide surface 26 is lowered by means of the positioning arrangement 30, so that the frame 42 comes into contact with the guide surface 26 and the hook 40, and the hook 40 can again be brought into engagement with the frame 42 or the projection 60.

The knives 44 are of conventional configuration and are supported under spring load in such a way that they project vertically out of the flow of the crop and can again be moved into it on the basis of the spring load. The springs, not shown but known in themselves, can be unloaded by means of the positioning arrangement 46, so that the knives 44 can be moved into a non-operating position either on the basis of the force of gravity or on the basis of levers engaging it. In the non-operating position, the forward edge of each of the knives 44 is located at or behind the guide surface 26 and is no longer in engagement with the rotor 32. If, in addition, the frame 42 is also unlocked and is pivoted along with the knives 44 and the guide surface 26, then the cutting arrangement 28 can be slid to the side along with the slide 48, that is, in the plane of the guide surface 26 or in the axial direction of the rotor 32, and then be maintained in the extended position (see FIG. 6).

Figure 9:
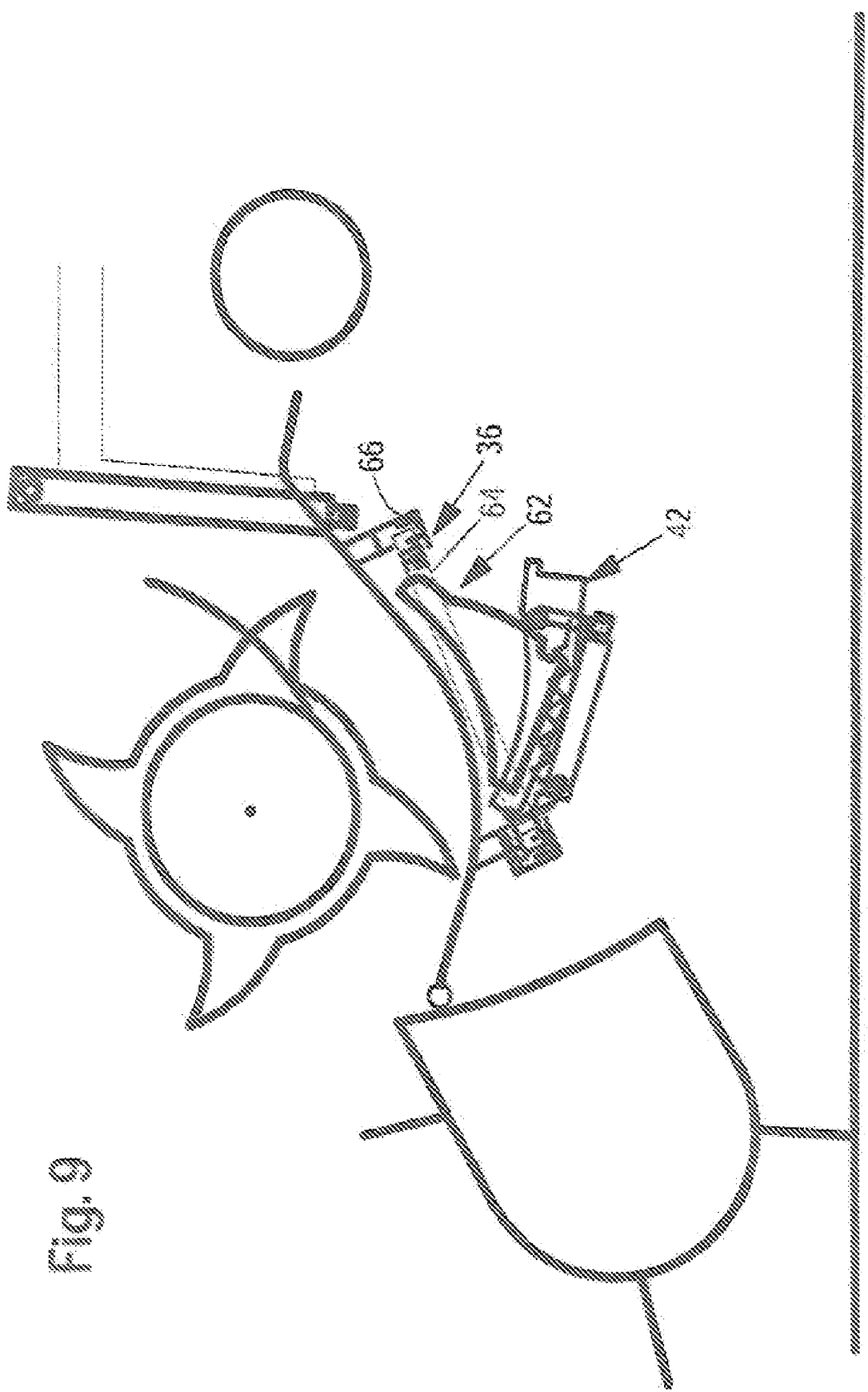
FIG. 9 shows a second embodiment of the invention in which the cutting arrangement is in a non-operating position.

The assembly 22, shown in FIG. 9, according to the second embodiment, differs from the first embodiment in such a way that the frame 42 is replaced by a double frame 62, of which the inner frame corresponds to the previous frame 42 which is retained in an outer frame 64 and can pivot vertically and can be repositioned in the same way as the frame 42, and while the outer frame 64 is guided in a lower guide arrangement 34 and an upper guide arrangement 66 so as to move sideways. In this case, the locking arrangement 36 operates between the outer and the inner frame 64, 42 instead of operating between the guide surface 26 and the frame 42. Finally, the frame 42 is supported in bearings, free to pivot vertically, not on the carrier 54 or 56, but on the outer frame 64.

Having described the preferred embodiment, it will become apparent that various modifications can be made without departing from the scope of the invention as defined in the accompanying claims.

The invention claimed is:

1. In a conveyor assembly including a guide member having an upwardly facing guide surface containing a plurality of spaced parallel slots oriented in a direction of operation, a plurality of knives mounted for selectively moving into said plurality of slots and penetrating said guide surface, and a positioning arrangement being coupled to at least said guide surface, the improvement comprising: said guide member being mounted for pivoting vertically about an axis located forward of said cutting arrangement; said cutting arrangement including a frame separate from said guide member; a mounting arrangement coupling said frame of said cutting arrangement to an underside of said guide member for vertical pivotal movement, about a second axis at a forward end location of said frame, between a raised, operating position, wherein said plurality of knives are located for moving into said plurality of slots, and a lowered position, wherein said plurality of knives are located completely below said guide surface so that they can be accessed from above; a locking arrangement being coupled between a rearward location of said frame and said guide member for selectively retaining said frame in said raised position; and said positioning arrangement being operable for pivoting said guide member, together with said cutting arrangement.

2. The conveyor assembly, as defined in claim 1, wherein said mounting arrangement includes a guide rail arrangement, and said cutting arrangement being mounted for movement along said guide rail arrangement.

3. The conveyor assembly, as defined in claim 2, wherein said guide rail arrangement is telescopic.

4. The conveyor assembly, as defined in claim 1 wherein said locking arrangement for selectively retaining said frame of said cutting arrangement in said raised, operating position includes a hook pivotally mounted to said guide member and a projection located on said frame which is engaged by said hook when said frame is locked in said raised, operating position.

5. The conveyor assembly, as defined in claim 1, wherein said knives are each mounted for being selectively moved between a raised operating position, wherein at least a substantial portion of the knife extends above said guide surface, and a lowered non-operating position, wherein at least a substantial portion of said knife is located below said guide surface, with this operation of the knives being possible when said frame is in said raised, operating position.

6. The conveyor assembly, as defined in claim 5, wherein said cutting arrangement further includes a second positioning arrangement coupled to said plurality of knives and being operable for effecting the selected movement of said knives between said operating and non-operating positions.

7. The conveyor assembly, as defined in claim 2, wherein said cutting arrangement is composed of two separate modules which are mounted to said guide rail arrangement such that said modules may be moved between a working position wherein they are engaged with each other, and a non-working position, wherein they are spaced apart.

8. The conveyor assembly, as defined in claim 7, wherein said separate modules include carriers which are engaged with said guide rail arrangement and which overlap each other when said modules are in said working position.

9. The conveyor assembly, as defined in claim 1, and further including a crop pick-up arrangement located forwardly of said guide member; and said guide member being pivotally mounted to said pick-up arrangement in a position for having said pick-up arrangement deposit crop on said guide surface.

10. The conveyor assembly, as defined in claim 1 and further including an undershot rotor located above said guide surface and having a plurality of crop-conveying elements disposed for conveying crop across said guide surface and against said knives.

* * * * *